United States Patent [19]
Casto et al.

[11] Patent Number: 5,176,106
[45] Date of Patent: Jan. 5, 1993

[54] ANIMAL COLAR HAVING A CLOSABLE CLASP

[75] Inventors: Jane L. Casto, Somerset, Wis.; Gerald E. Drake, Oakdale; Curtis A. Hostager, St. Paul, both of Minn.

[73] Assignee: Minnesota Mining and Manufacturing Company, St. Paul, Minn.

[21] Appl. No.: 606,514

[22] Filed: Oct. 31, 1990

[51] Int. Cl.⁵ .............................................. A01K 27/00
[52] U.S. Cl. .................................. 119/106; 24/169; 24/543
[58] Field of Search ................. 109/106, 109; 24/543, 24/168, 169

[56] References Cited

U.S. PATENT DOCUMENTS

| | | | |
|---|---|---|---|
| 739,645 | 9/1903 | Brower | 24/168 |
| 1,781,709 | 11/1930 | Spear | 24/169 |
| 2,900,696 | 8/1959 | Bacon | 119/106 |
| 3,012,297 | 12/1961 | Wade | 24/16 PB |
| 3,034,189 | 5/1962 | Twentier | 24/129 R |
| 3,107,935 | 10/1963 | Erke | 292/325 |
| 3,192,584 | 7/1965 | Pape | 24/16 |
| 3,224,055 | 12/1965 | Orser | 24/16 PB |
| 3,237,256 | 3/1966 | Young | 24/16 PB |
| 3,755,859 | 9/1973 | Solari | 24/84 B |
| 3,824,654 | 7/1974 | Takabayashi | 24/543 |
| 3,983,604 | 10/1976 | Phillips | 24/16 |
| 4,038,726 | 8/1977 | Takabayashi | 24/543 |
| 4,180,016 | 12/1979 | George | 119/106 |
| 4,356,599 | 11/1982 | Larson et al. | 24/16 PB |
| 4,453,295 | 6/1984 | Laszczower | 251/10 |
| 4,881,492 | 11/1989 | Jones | 119/106 |
| 4,954,098 | 9/1990 | Hollingsworth et al. | 439/404 |

FOREIGN PATENT DOCUMENTS

| | | | |
|---|---|---|---|
| 1962902 | 3/1989 | Fed. Rep. of Germany | |
| 2619989 | 3/1989 | France | 119/156 |

Primary Examiner—John G. Weiss
Attorney, Agent, or Firm—Gary L. Griswold; Walter N. Kirn; Charles D. Levine

[57] ABSTRACT

A closable band includes a strap and a clasp. The strap is made of a material having a substantial coefficient of static friction when its ends overlap and contact each other. The clasp is formed with a base portion and an upper portion which are connected by a hinge. A latch secures the free edges of the base portion and the upper portion together. When the band is assembled by overlapping the ends of the strap and securing the clasp around the overlapped ends of the strap, the base portion and the upper portion provide a clamping force on the overlapped ends.

7 Claims, 1 Drawing Sheet

ANIMAL COLAR HAVING A CLOSABLE CLASP

TECHNICAL FIELD

The present invention relates to the binding of the ends of belts and bands. More particularly, the present invention relates to the binding of the overlapped ends of bands suitable for use as animal collars.

BACKGROUND OF THE INVENTION

It has become well known to dispense insecticides for controlling fleas and ticks on animals by using a disposable collar in which the insecticide has been impregnated. As the collar is disposed of after its charge of insecticide is exhausted, the costs of manufacturing these collars should be minimized. Thus, the cost of a closure for these collars must be minimized as this is a large portion of the cost. However, the closure should be simple, since the collar frequently will be applied when the animal is active and moving. Concomitantly, the collar should resist attempts by the animal to dislodge it during use. However, as discussed in U.S. Pat. No. 4,881,492 to Jones, it is also desirable to permit the collar to break away when subjected to excessive force, to prevent injury if the collar gets hooked by fences or other objects.

Buckles are commonly used on animal collars to secure the collars around the neck of an animal. However, buckles are expensive to manufacture and require time consuming and costly assembly steps. Furthermore, buckles are cumbersome to fasten on an animal and are not transferable from one band to another.

Various types of band closures for differing purposes are known. For example, U.S. Pat. No. 3,192,584 to Pape discloses a strap coupler particularly suited for securing together overlapping ends of a strap used for banding boxes, bales, and other packages. However, the coupler is not hinged, and is time consuming to apply and remove.

U.S. Pat. No. 3,107,935 to Erke discloses a seal device used to grip the overlapped edges of plastic tape. However, the seal is not releasable, making it unsuitable for use as a flea collar which must be removed when its insecticidal agent has been exhausted.

Phillips, U.S. Pat. No. 3,983,604, discloses an identification band clip for use in attaching I.D. bracelets to patients in hospitals. A Z-shaped retaining plate having barbs prevents slippage of the strap material within the clip but physically damages the bracelet material.

None of these patents discloses a band with a closure system suitable for use as animal collars. None of the known bands and closure systems includes a unitary clasp which secures the ends of the band together without deforming the band while permitting the band to break away when subjected to excessive, predetermined forces.

SUMMARY OF THE INVENTION

The present invention is directed to a closable band such as a collar including a substantially flat strap having first and second longitudinal ends. The strap is made of a material having a coefficient of static friction sufficient to resist substantial longitudinal forces when the ends are overlapped and forced together, and a clasp. The clasp is formed as a single element either separate from or together with the strap and includes a base portion and an upper portion. Both the base portion and the upper portion have hinged and free ends. A hinge connects the hinged end of the base portion and the hinged end of the upper portion. The hinge may be a living hinge, molded or machined into the clasp. The free end of the upper portion is secured to the free end of the base portion to close the clasp.

The collar is closed by overlapping and contacting the ends of the strap and securing together these ends. The clasp closes around the overlapped ends of the strap and is secured by a latch which retains the clasp in the closed position. This forces the base portion and the upper portion together to provide a clamping force on the overlapped ends of the collar without deforming the strap. The base and upper portions of the clasp each can have a textured inner surface which contacts the strap ends when the collar is closed. The clasp is configured such that the assembled collar will not separate when subject to longitudinal forces less than 20N but will separate when subject to forces greater than about 80N.

The strap of the collar may be impregnated with an insecticide for use as an animal flea and tick collar. Alternatively, the collar can simply be used as an identification device. When used as a flea collar, the clasp may be reusable, requiring only replacement of the exhausted strap.

DETAILED DESCRIPTION OF PREFERRED EMBODIMENTS

Figure 1:
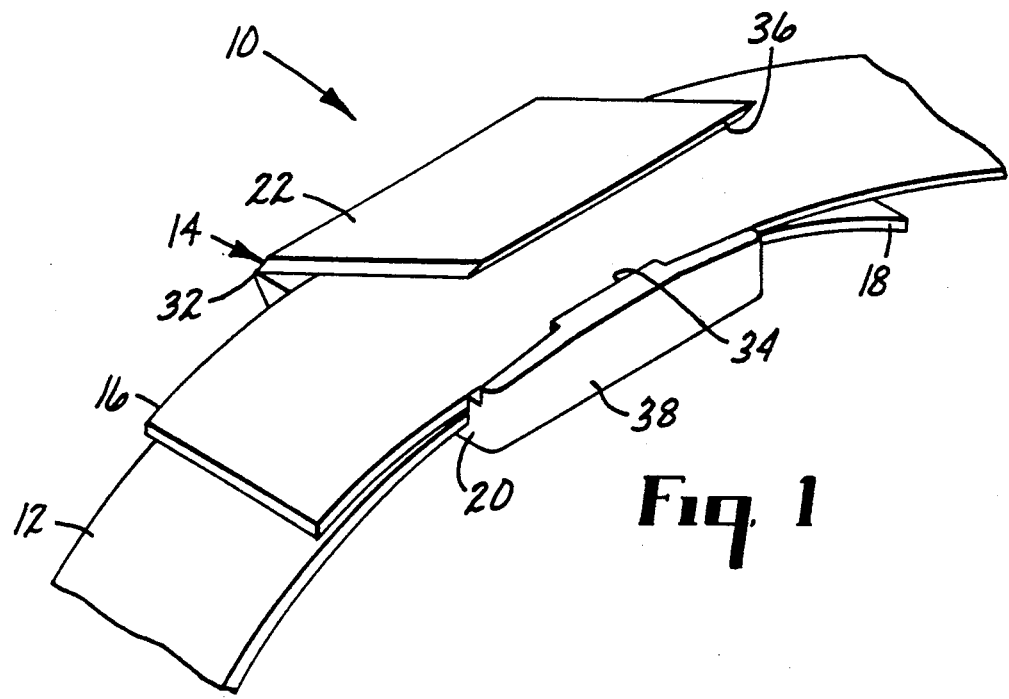
FIG. 1 is a perspective view of a collar including a clasp and a portion of a closable band according to the present invention.

Referring to FIG. 1, the closable band, shown and described as collar 10, includes a strap 12 and a clasp 14. The strap 12 can be inexpensively formed, for example, by simple extrusion and supplied in a single length which can be cut to a final length during application. No additional fabrication steps are required. The clasp 14 can be easily and inexpensively fabricated in one piece by, for example, injection molding.

The strap 12 is generally elongated along its axis and can have a uniform width as shown or can have a varying width. The strap 12 has first and second longitudinal ends 16, 18, and preferably is substantially flat having two opposing major surfaces. At least the ends 16, 18 are made of a material having a high coefficient of static friction with respect to each other. The coefficient of static friction is sufficient to resist longitudinal forces which tend to pull the overlapped ends 16, 18 apart with a relatively sliding motion. As discussed here, longitudinal forces are those forces acting generally along the axis of the strap 12 in the vicinity of the ends 16, 18. For example, the strap 12 can be made from a polyester mesh coated with an acrylated urethane having a finished cross section of 15 mm by 1 mm. The strap 12 of the collar 10 can be impregnated with an insecticide, such as chlorpyrifos, propoxur, permethrin, pyrethrum, or tetrachlorvinphos, for use as an animal flea and tick collar. Alternatively, the collar 10 can simply be used as an identification collar.

Figure 2:
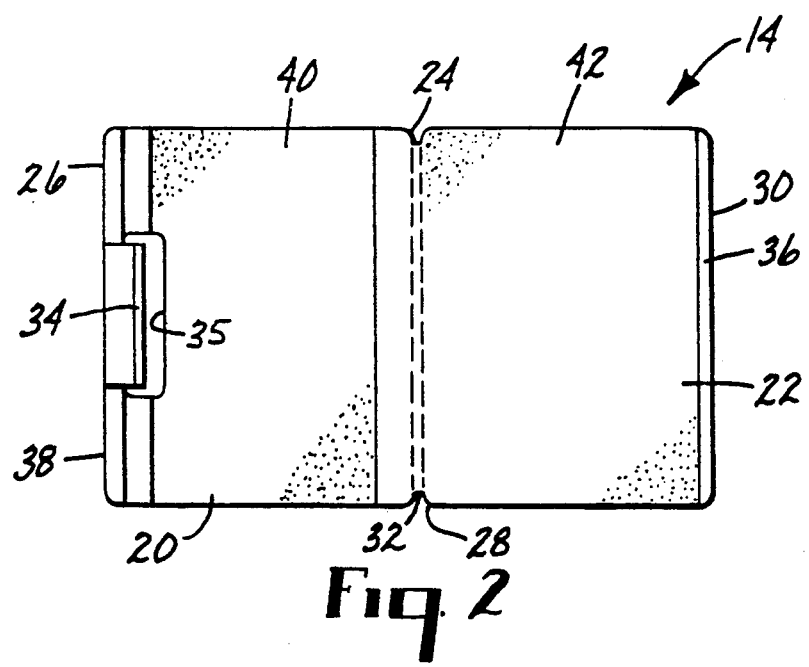
FIG. 2 is a top view of the clasp of FIG. 1.
Figure 3:
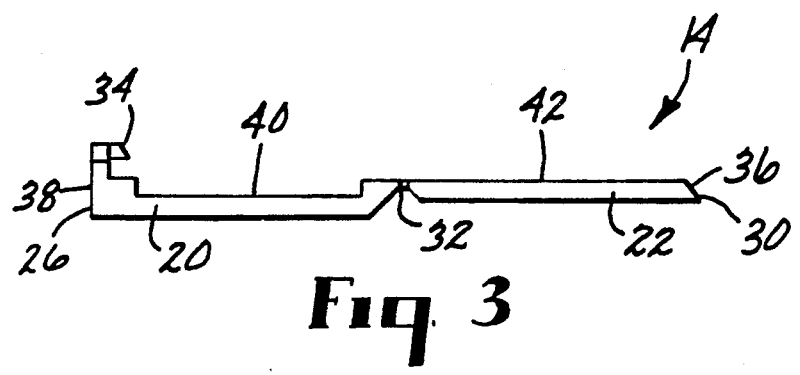
FIG. 3 is a side view of the clasp of FIG. 2.

The clasp 14, shown in FIGS. 1, 2, and 3, is formed as a single element either separate from (FIGS. 2 and 3) or together with (FIG. 1) the strap 12. When the collar 10 is used as a flea collar, the clasp 14 may be reusable, requiring replacement of only the exhausted strap 12.

The clasp 14 can be fabricated from a polymeric material such as polypropylene.

The clasp 14 includes a base portion 20 and an upper portion 22, both of which are substantially planar. The base portion 20 includes a hinged end 24 and a free end 26 while the upper portion 22 includes a hinged end 28 and a free end 30. A hinge 32 connects the hinged end 24 of the base portion 20 and the hinged end 28 of the upper portion 22. The hinge 32 may be a living hinge, molded or machined as a thin-walled web from the same polymeric material as the rest of the clasp 14. A securing device secures the free end 30 of the upper portion 22 to the free end 26 of the base portion 20. The securing device should be simple. In the illustrated embodiment, the securing device includes a latch 34 which secures together the edges 36, 38 of the upper portion 22 and the base portion 20, respectively. The latch 34 can releasably secure together the edges 36, 38 so that the clasp 14 can be reused. Alternatively, where reusability is not desired, the latch need not be releasable. An opening 35 is formed in the base portion 20 opposite the latch 34. This opening 35 is used during the manufacturing of the clasp 14, and also affects the force required to open the clasp.

The collar 10 is readily closed by hand by overlapping and contacting two segments of the strap 12, preferably the ends 16, 18, and securing together these ends. As there are no restrictions on the positioning of the strap 12 within the clasp 14, the collar 10 is infinitely adjustable. In the illustrated embodiment, the ends 16, 18 of the strap 12 overlap in a straight line. The segments of the strap 12 which are secured together could be adjacent both ends 16, 18 or near the longitudinal center of the strap 12 and adjacent one of the ends 16, 18. It is also possible to overlap the ends 16, 18 so that the ends cross each other at an angle. However, the crossed configuration reduces the potential contact area between the ends 16, 18 and would use a clasp 14 having a shape modified from that of the illustrated embodiment.

FIG. 1 shows the ends 16, 18 after they have been overlapped, placed in contact with each other, and laid against the base portion 20 of the clasp 14, but before the clasp 14 is closed around the overlapped ends 16, 18. The upper portion 22 is shown supported by the hinge 32, but not yet engaging the latch 34 on the base portion 20. The clasp 14 closes around the overlapped ends 16, 18 of the strap 12 to move the upper portion 22 toward the base portion 20. The edge 36 of the upper portion 22 resiliently deforms the edge 38 of the base portion 20, allowing the edge 36 of the upper portion 22 to be secured under the latch 34.

This clamping secures the clasp 14 in the closed position and forces the base portion 20 and the upper portion 22 together to provide a sufficient clamping force on the overlapped ends 16, 18. This secures the ends together without materially deforming the strap 12, as by piercing, bending, or otherwise mutilating, either linearly or planarly. It is recognized that any time the ends 16, 18 are clamped together there is always some small level of deformation, depending on the material properties of the strap 12. Preferably, any deformations are microscopic and will not affect the performance or characteristics of the collar 10, strap 12, or clasp 14. The clamping force required to secure the clasp 14 is selected to be insufficient to deform the strap 12 materially, as this level is high enough for the clasp 14 to perform properly while minimizing manufacturing costs. It is much cheaper to manufacture a clasp that does not have to generate forces sufficient to deform a strap. This is particularly the case when the collar 10 is used for animal collars as the collar 10 is relatively thick and stiff. Additionally, this force level makes it easy to fasten the collar around the neck of an animal and to adjust and/or refasten the collar as necessary.

FIG. 2 shows the inner surfaces 40, 42 of the base portion 20 and the upper portion 22, respectively, of the clasp 14. These surfaces 40, 42 contact the ends 16, 18 of the strap 12 when the clasp 14 is closed. The inner surfaces 40, 42 need not be textured to provide any frictional forces with the strap ends 16, 18 as the friction between the ends 16, 18 is sufficient to prevent the strap 12 from becoming disassembled. However, these surfaces 40, 42 alternatively can be textured to provide a predetermined amount of friction to the strap 12. The entirety of surfaces 40, 42 can be textured or only portions of these surfaces 40, 42 can be textured. This friction alters the maximum force which will cause the ends 16, 18 of the strap 12 to become disassembled. It has been found that forming the surfaces 40, 42 with a peak-to-valley texture of about 0.0010 mm (0.000040 in) provides desired friction levels.

When the collar 10 is used as an animal collar, the clasp 14 is configured such that the assembled collar 10 will not separate when subject to longitudinal forces less than a first predetermined level, but will separate when subject to longitudinal forces above a second predetermined level. The lower force level is the amount of force that an animal such as a dog or cat could exert on the collar in attempting to remove it. The upper force level is the amount of force required to remove the assembled collar 10 to prevent injury to the animal if the collar becomes snagged during use. The collar 10 may be configured to separate at forces between the upper and lower force limits as long as it separates when subject to forces above the upper limit and does not separate at forces below the lower limit. These longitudinal forces are defined as those generated by grasping the strap 12 on each side of the clasp 14 and exerting a pulling force on the collar 10 directed to cause the ends of the strap 12 to slide free of the clasp 14. These force limits can be varied by changing the width or the thickness of the collar or the length of the clasp 14.

Additionally, smaller collars with smaller upper and lower force limits could be used for smaller animals which are generally weaker. A smaller lower force limit can be used without allowing the smaller animal to purposely remove the collar, and a smaller upper force limit can be used so the collar can be removed more easily in emergencies. However, it is intended that a single collar, having a standard width of from 0.64–1.90 cm (0.25–0.75 in) and preferably from 1.59–1.27 cm (0.625–0.5 in), and standard thickness of 0.025–0.20 cm (0.01–0.08 in) and preferably 0.10 cm (0.04 in), and a standard length of from 30.5–76.2 cm (12–30 in) and preferably approximately 55.9 cm (26 in) be used for all animals. After wrapping the collar around the animal's neck, any excess length can be removed with a scissors. A lower force level of 20N is used. At forces above 80N, the assembled collar 10 will separate to prevent injury to the animal if the collar becomes snagged during use.

Four collars 10 as described above were tested by assembling the strap 12 with the clasp 14, and grasping the strap 12 in two places, one on each side of the clasp 14. The tested clasp inner surfaces 40, 42 had a surface finish of 32. A longitudinal pulling force was applied to disassemble the collar 10 by causing the ends 16, 18 of the strap 12 to slide free of the clasp 14 at a fixed rate of 12.5 cm per minute. The force rose rapidly as slack was removed, and peaked when the strap 12 began to slide within the clasp 14 (when the friction was no longer static). Once the strap 12 began moving, the force on the strap 12 decreased until the collar 10 was entirely disassembled. The peak force averaged 54.3N (12.2 lb), while the lower force during movement of the strap 12 ranged from about 4.4N (1 lb) to 22.2N (5 lb). The collars were secure below 20N, and all were disassembled by forces greater than 80N. This testing regimen was repeated with the texture of the inner surfaces 40, 42 roughened to about 0.038 mm (0.0015 in). The peak force required to begin movement of the strap 12 was not substantially affected, but the force during movement ranged between 22.2N (5 lb) and 44.4N (10 lb).

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, it is envisioned that the clasp 14 can be used to secure together more than two segments of a strap or segments from more than one strap.

We claim:

1. A closable band comprising:
   a strap having first and second longitudinal ends and made of a material having a coefficient of static friction sufficient to resist longitudinal forces when the ends are overlapped and in contact with each other; and
   a clasp formed as a single element and comprising:
      a base portion having hinged and free ends;
      an upper portion having hinged and free ends;
      a hinge connecting the hinged end of the base portion and the hinged end of the upper portion; and
      means for securing the free end of the upper portion to the free end of the base portion by overlapping and contacting the ends of the strap and closing the clasp around the ends of the strap to move the base portion and the upper portion toward each other to provide a clamping force on the strap ends thereby to secure together the strap ends without materially deforming the strap ends such that the assembled band will not separate when subject to longitudinal forces that are less than 20N and the assembled band will separate when subject to forces greater than 80N.

2. The closable band of claim 1 wherein the clasp and the strap are formed together as a single component.

3. The closable band of claim 1 wherein the strap is substantially flat and when the band is closed the major surfaces of each end are disposed on top of each other.

4. The closable band of claim 1 wherein the securing means comprises a latch that is repeatably openable and closable.

5. The closable band of claim 1 wherein the upper and base portions of the clasp each include an inner surface which contact the strap ends when the band is closed, and wherein at least part of the inner surfaces are textured.

6. The closable band of claim 1 wherein the strap is made of an acrylated urethane reinforced with fibrous material.

7. An animal collar comprising:
   a substantially flat strap having first and second longitudinal ends and made of a material having a coefficient of static friction sufficient to resist longitudinal forces when the ends are overlapped and in contact with each other, wherein the strap is impregnated with an insecticide; and
   a clasp formed as a single element and comprising:
      a base portion having hinged and free ends, and an inner surface which contacts the strap ends when the strap is closed, wherein at least part of the inner surface is textured;
      an upper portion having hinged and free ends, and an inner surface which contacts the strap ends when the strap is closed, wherein at least part of the inner surface is textured;
      a hinge connecting the hinged end of the base portion and the hinged end of the upper portion; and
      means, comprising a latch which is repeatably openable and closable, for releasably securing the free end of the upper portion to the free end of the base portion by overlapping and contacting the ends of the strap and closing the clasp around the ends of the strap to move the base portion and the upper portion toward each other to provide a clamping force on the strap ends thereby to secure together the strap ends without materially deforming the strap ends such that the assembled collar will not separate when subject to longitudinal forces less than 20N and will separate when subject to forces greater than about 80N.

* * * * *